United States Patent [19]

Sterlini

[11] 4,284,480
[45] Aug. 18, 1981

[54] METHOD FOR THE CONCENTRATION OF SOLUTIONS

[75] Inventor: Jacques Sterlini, Paris, France

[73] Assignee: BBC Brown, Boveri & Company Limited, Baden, Switzerland

[21] Appl. No.: 85,868

[22] Filed: Oct. 18, 1979

[30] Foreign Application Priority Data

Oct. 18, 1978 [FR] France .................................. 78 29689

[51] Int. Cl.³ .......................... B01D 1/28; B01D 3/02
[52] U.S. Cl. .................................... 203/24; 159/47 R; 203/26; 203/71
[58] Field of Search ................. 159/17 R, 17 P, 17 C, 159/18, 19, 22, 24 R, 24 A, 24 B, 47 R; 202/174, 233–235; 203/24, 26, 27, 22, 23, 25, 10, 11, 71, 73, 75, 77, 78, 80, 81, 82, 84

[56] References Cited

U.S. PATENT DOCUMENTS

| 3,697,382 | 10/1972 | Porteous | 202/173 |
| 4,018,656 | 4/1977 | Rodgers et al. | 203/11 |
| 4,094,747 | 6/1978 | Pfenninger | 202/173 |

FOREIGN PATENT DOCUMENTS 2352247 12/1977 France .
2307227 9/1978 France .
2383411 7/1979 France .

Primary Examiner—Frank Sever
Attorney, Agent, or Firm—Oblon, Fisher, Spivak, McClelland & Maier

[57] ABSTRACT

Disclosed is a method and apparatus for the concentration of a solution of a "dissolved" material in a "solvent" without the input of any outside heat and by the furnishing of only work, the latter having a value close to the theoretical work of unmixing.

4 Claims, 5 Drawing Figures

METHOD FOR THE CONCENTRATION OF SOLUTIONS

BACKGROUND OF THE INVENTION

1. Field of the Invention:

The present invention relates to a process for the concentration of a diluted solution, and in particular an aqueous solution.

2. Description of the Prior Art:

Such a problem is frequently encountered, for example, in the chemical, pharmaceutical and agricultural food industries.

The standard techniques most frequently used involve evaporators which are, in most cases, applied in multiple-effect arrangements so as to limit energy consumption as much as possible; but even under such conditions, the energy consumption is always high, and certainly higher than the theoretical value of the work of unmixing.

Processes and apparatus are known for which the following French patent applications have been filed: FR Pat. No. 75 114 38 (published under No. 23 07 227), FR Pat. No. 76 14 965 (published under No. 23 52 247) and FR Pat. No. 77 07 041. The machines described in these patents can be termed "polytropic machines."

They are constituted by a series of pressure/temperature cells in series in which a working fluid that is present in each cell circulates in the form of saturated vapor in contact with its liquid phase. In addition there are, in at least some of the cells, one or more heating or cooling elements which connect the cells with heat-transmitting fluids which add heat from a generating source or remove the heat required for an area of consumption. Finally, each cell is connected with the neighboring ones in the vapor passage by means of a compressor or a turbine, depending on whether the primary heat entering the process is, on the average, available at a high or a low temperature level, the vapor rising or descending through the pressure/temperature levels. Alternatively, the connection is in the liquid passage which circulates in an opposite direction to the vapor and in equal quantity, through a calibrated orifice, to descend through the pressure/temperature levels or in order to rise through the levels, by a pump. The disclosures of the publications illustrate the structure of such machines.

In the case where the heat-transmitting fluid supplies heat (it is then passing through the series of stages in the direction of decreasing temperatures), a vapor of the working fluid is produced by ebullition of the liquid present in the cell and, in the opposite case some vapor of the working liquid is condensed. Also, the flow rates of vapor and of liquid evolve from stage to stage in accordance with the quantities of heat that are added or subtracted as a function of the Q(T) law in accordance with which the addition or subtraction of heat is effected, i.e. as a function of the dimensioning of the exchange elements.

It must be noted that, in principle, at the interface between two successive cells, the sum of the flow rates of the working fluid entering in the form of vapor or in the form of liquid is always equal to the sum of the flow rates of the same fluid leaving in the form of vapor or in the form of liquid, it always being true that the flow rates of the working fluid as vapor and liquid in opposite directions are equal.

It can be observed that the polytropic machines described in the cited patents can be assembled on the basis of four elementary series, two of which will be used in the following description. The series are:

a compressor series, used for a "condensation process with absorbed work"

a heated compressor series, used for an "ebullition process with absorbed work"

a cooled turbine series, used for a "condensation process with furnished work"

a heated turbine series, used for an "ebullition process with furnished work."

These four elementary types of series each comprise an open endstage through which enter or leave the liquid and vapor flows of the working fluid, and a closed endstage where the working fluid is either completely vaporized or completely condensed.

The following table indicates at the side where the open endstage is located, the inputs and outputs of working fluid in relation to each particular series, as well as the direction of flow of the heat-transmitting fluid.

| Type of series | Open stage | Working fluid | Direction of heat-transmitting fluid |
| --- | --- | --- | --- |
| Heated compressor series | higher temperature | input: liquid output: vapor | decreasing temperatures |
| Cooled compressor series | lower temperature | input: vapor output: liquid | increasing temperatures |
| Heated turbine series | lower temperature | input: liquid output: vapor | decreasing temperatures |
| Cooled turbine series | higher temperature | input: vapor output: liquid | increasing temperatures |

In these systems, the heat-transmitting fluid may pass through several successive stages, or through only a single one. At the limit it is possible to have a heat-transmitting fluid of a different nature for each stage of a given series.

It is also known that the operation of a polytropic machine can be generalized to the case where the flow rates at the entry to the open stage for the liquid and vapor working fluid are different; in such a case, the difference between the flow rates circulating in the two directions is maintained at the value it has upon entry, until it reaches the other endstage, which is thus crossed by a flow of working fluid and is therefore no longer a closed stage; it is said in this case that there is an "open process at both ends," or more simply that there is an open process. We will now describe two examples of the process which will be used within the framework of the invention.

The first process, or process A, is a condensation process with absorbed work, where a vapor flow $M+m'$ enters into the low-temperature open stage; a liquid flow M exits from the same open stage, and a vapor flow $m'$ exits from the high-temperature endstage.

The second process, or process B, is an ebullition process with work furnished to the outside. Into the low-level open stage enters a liquid flow M, and a vapor flow $M+m'$ exits; the vapor flow $m'$ enters into the high-level endstage.

Finally, it is known that in the case where the heat-carrying fluid is identical with the working fluid, the heat exchanges between the two fluids need not be effected through a partition, and that the heat can be exchanged without inconvenience through mixing at each stage; the polytropic process is then called an "open process" without exchange surface; thus, for example, a heated compressor series where the liquid and vapor flows entering the high-temperature open stage have the value M, and where the heat-transmitting fluid entering the open stage and exiting at low-level from the closed stage has the value m, has in principle an operation that is identical to that of a series where the liquid flow entering the open stage is M+m, the vapor flow exiting from the same stage is M, and where a flow m exits at low level.

SUMMARY OF THE INVENTION

The object of the present invention is a process and an apparatus for the concentration of a solution of a "dissolved" material in a "solvent" without addition of outside heat and with supply of work only, the latter having a value close to the theoretical work of demixing.

Thus, the invention is concerned with a procedure for the concentration of a solution involving an ebullition process with work furnished to the outside and a condensation process with absorbed work. The process of ebullition involves the circulation of fluids in a first set of stages with exchange cells connected on the vapor side by means of turbines and on the liquid side by means of a system of pipes equipped with pumps. The process of condensation involves a circulation of fluids in a second set of stages with exchange cells connected on the vapor side by means of compressors and on the liquid side by calibrated orifices. The procedure is characterized by the introduction from the outside as a working fluid a flow of diluted solution to be concentrated, through an endstage termed an open stage, of the ebullition process. There is introduced at the other endstage, termed a semi-open stage, of the ebullition process a flow of concentrated solution which is made to circulate through the first set of stages by exchanging the heat through a partition and which exits from the low-temperature open stage. The flow rates of "dissolved" material entering with the diluted solution and exiting with the concentrated solution are equal. The vapor flow of "solvent" exits from the open stage of the ebullition process through at least one compressor from the compressor series in order to raise the pressure in said flow. This vapor flow of the solvent under increased pressure is introduced in the condensation process, which operates with the solvent as working fluid, and evacuates an equal flow of solvent liquid, in such a manner that to each stage of the ebullition process there corresponds a stage of the condensation process, each stage of the ebullition process receiving for its heating the heat removed from the corresponding stage of the condensation process, the heat exchanges resulting from the temperature difference between corresponding stages of condensation and of ebullition.

Another object of the invention is a device for the performance of the method of the invention. The device comprises a first set of stages composed of exchange cells, of steam turbines connected to said cells and of a system of pipes for liquids, equipped with pumps, connecting the cells and a second set of stages constituted by exchange cells, by compressors connected to the exchange cells and by a system of pipes for liquids equipped with calibrated orifices or expansion orifices connecting the cells, by exchange elements crossing the respective cells of the two sets. The device is characterized by a conduit for the introduction of the diluted solution into the open stage of the first set of stages, a conduit for introduction of a flow of concentrated solution at the semi-open stage of the first set of stages, and for making the concentrated solution cross the cells of the first set, and at least one vapor compressor placed in the vapor passage of the solvent that exits from the open stage of the first set and introduces said solvent as working fluid into the second set. The number of cells in the first set are equal to that in the second set. The exchange element in each cell of the first set is combined with the exchange element in the corresponding cell of the second set.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

In order to illustrate the invention, we will first consider the ideal case where all the thermodynamic operations carried out are perfect. This requires, in particular, that the following conditions be satisfied:

that the number of stages is infinite (in order for the thermodynamic developments to be continuous);

that the rotating machines have an efficiency equal to one;

that the discrepancies between exchange temperatures are zero, which implies that the corresponding stages of the two processes are at the same temperature; and that the solution being handled is infinitely diluted.

Figure 1:
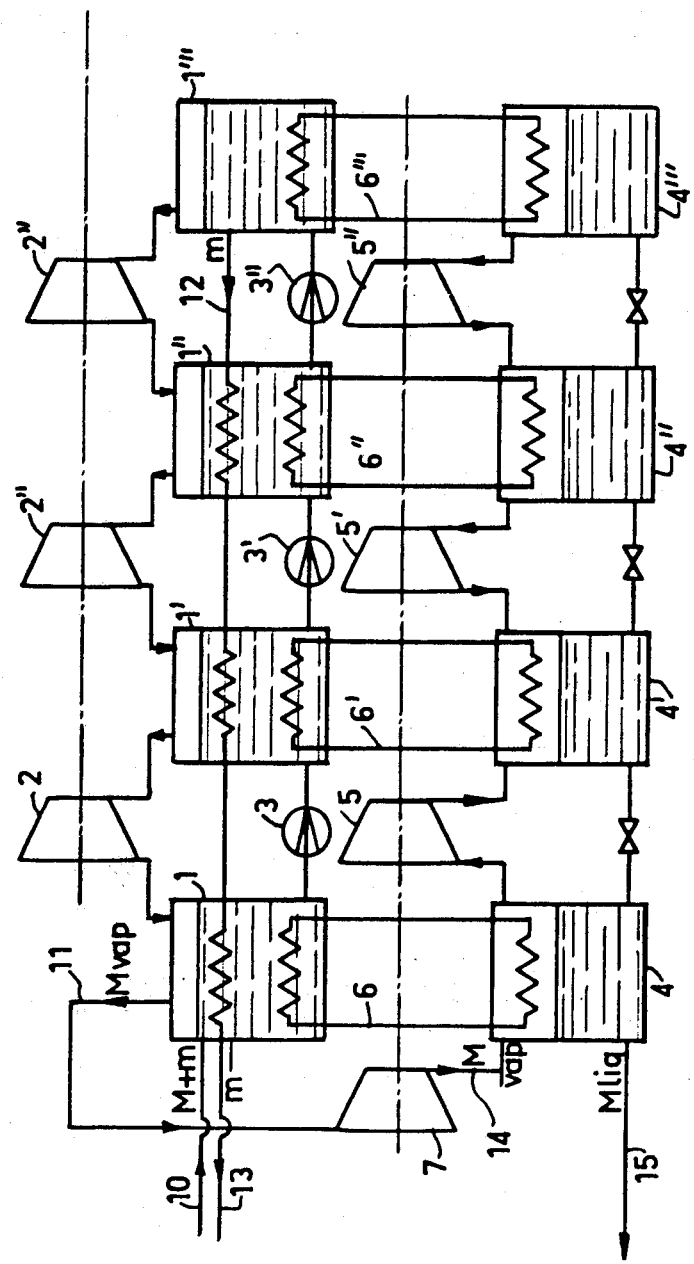
FIG. 1 is a schematic diagram illustrating the process of the invention.

In everything that follows, the flow rates for the effluents are consistently expressed in terms of the solvent only. In addition, two flows circulating in opposite directions are said to be "of opposite signs." Referring to FIG. 1, it can be seen that the ebullition process comprises four stages; the exchange cells 1, 1', 1" and 1"', the turbines 2, 2' and 2", and the liquid pumps 3,3' and 3". The diluted solution (flow rate: M+m) enters the open stage along arrow 10, while, from the same open stage, there exits along arrow 11 a vapor flow of the solvent equal to M. A flow m of concentrated solution formed in the last stage 1"', exits from that stage (which is thus semi-open) along arrow 12, descends again from stage to stage while exchanging heat through a partition with the successive cells and finally exits cold along arrow 13. The liquid is transferred from stage 1 to stage 1"' by the pumps 3, 3',3" for successive ebullition. The solvent vapor M passes from stage 1"' to stage 1 through the turbines 2,2'2".

On the other hand, the condensation process involves exchange cells 4, 4', 4" and 4"' and compressors 5, 5' and 5". Heat-transmitting circuits 6,6'6" and 6"', or exchange elements, connect the corresponding stages of the two sets of cells for the heat exchanges. The vapor of the solvent (flow rate M) enters the open stage (along arrow 14) and the same flow of liquid solvent exits from this stage along arrow 15. Following transit to stage 4''' by the compressors, 5, 5',5'' and return to stage 4 by lines 24 and orifices 26.

In the series of corresponding stages at temperatures $T_1, T_2, \ldots T_n$, the pressures that occur on the side of the condensation process are the vapor pressures of the solvent for the corresponding temperatures, to wit $p_1$, $p_2 \ldots p_n$, and on the ebullition process side, they are the vapor pressures above the solution, i.e.: $p'_1, p'_2 \ldots p'_n$. Owing to the tonometric drop, the pressure in a stage of ebullition is below that of the corresponding stage of the condensation process.

If the solution entering the condensation procees is already sufficiently concentrated, we have:

$$p_1 > p'_1$$

Compressor 7 sucks in the flow M of the ebullition process at the pressure $p'_1$ and compresses it to $p_1$ in order to introduce it into the condensation process; compressor 7 thus plays a different role from that of the other compressors in the process. If the entering solution is very diluted (which corresponds to the hypothesis stated above), the difference between $p_1$ and $p'_1$ becomes practically zero, and the work performed by this compressor also becomes practically equal to zero. The presence of compressor 7 in FIG. 1 thus constitutes a limiting case in the framework of this hypothesis.

In order to illustrate the overall operation of the process, we will examine successively the balance of mass and the balance of energy. We will assume initially that the specific heats of the diluted solution, of the concentrated solution and of the solvent are the same.

The total liquid flow through the ebullition process (algebraic sum of the entering flow of diluted solution and the exiting flow of concentrated solution) is M.

The flow of solvent vapor through the condensation process is also equal to M.

Inasmuch as the corresponding stages of the two processes are at the same temperature, that the quantities of heat involved in the corresponding stages are equal in absolute value by design, and that the absolute values of the flow rates for the working fluid are equal at the limit, it is evident that the vapor and liquid flows through two corresponding stages are equal in absolute value, that the measurable amounts of heat involved in the two corresponding stages are equal in absolute value and that the vapor of the solvent produced in an ebullition stage is equal to the condensate produced in the corresponding stage.

Thus, the mass and energy balances are consistent.

The work of the condensation process is greater than that of the ebullition process since:
on the one hand, the flow as a function of temperature is the same for the two processes,
on the other hand, the pressure differential $p_n - p_1$ in the condensation process is greater than that in the ebullition process, $p'_n - p'_1$.

Thus the difference between the two is the work furnished by the outside milieu.

There is no heat exchange with the outside.

Therefore, the external work considered above is the reversible work of unmixing.

We must now come back to the hypothesis that the specific heat is the same for the diluted solution, the concentrated solution and the solvent; initially, this hypothesis is useful because it simplifies the theoretical description, and it is justifiable for taking into account the different specific heats introduced into the balance sheets, additional variables that are slight in relation to the work.

In reality, the specific heat for the solutions is greater than that of the solvent. The specific heats for the flow rates through the stages of the ebullition process are thus greater on the average than those of the condensation process. If one were to keep the foregoing values for the rates of flow at the level of the open stages, the measurable heat requirement for the stages of the ebullition process would be greater on the average and, everything else being equal, the vapor production in the ebullition stages would be smaller on the average; the system might not be balanced from the mass and energy point of view.

Figure 2:
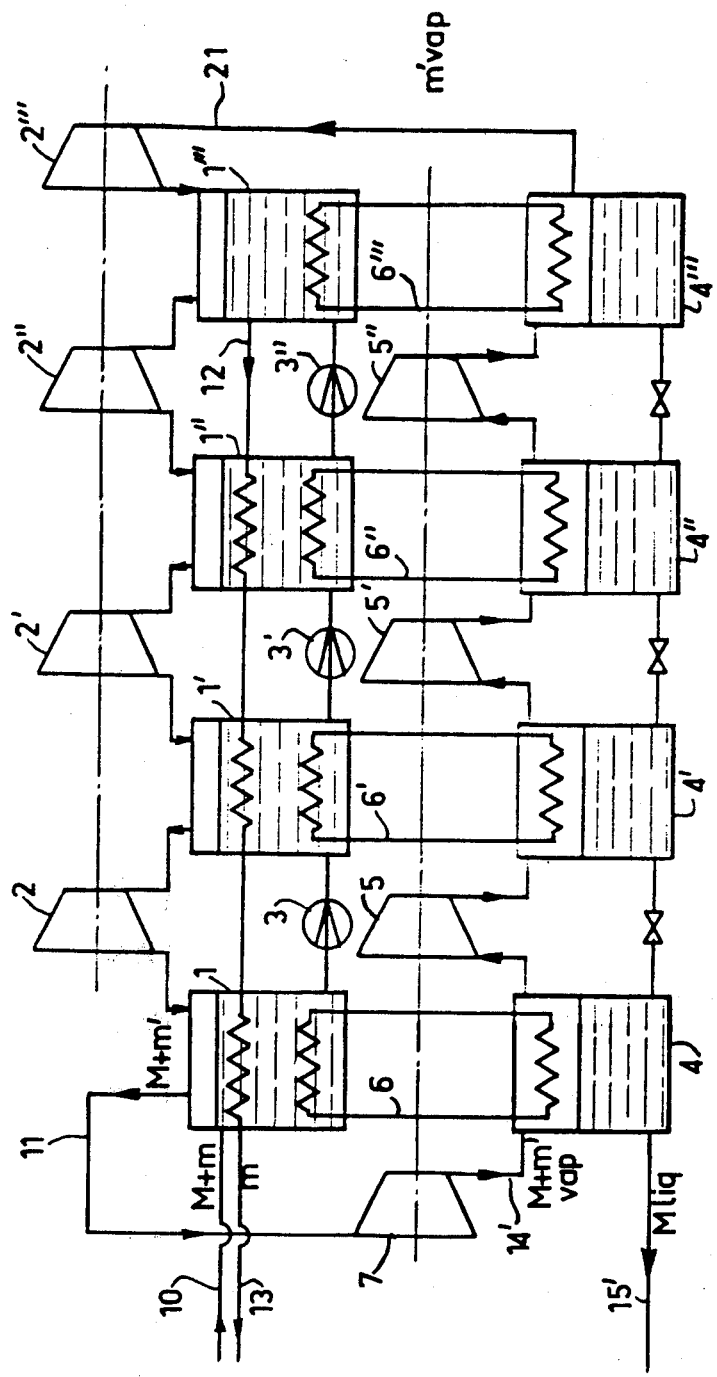
FIG. 2 is a variant embodiment of the process of FIG. 1.

FIG. 2 represents a theoretical diagram in which, in order to balance the whole, an additional flow $m'$ is introduced which goes through the entire process in a closed circuit.

The condensation process now receives at the entry point of open stage 4, along arrow 14, the vapor flow $M + m'$; there flows out of the same 4, along arrow 15, the liquid flow M; the vapor flow $m'$ exits from stage 4''' along arrow 21. It will be recognized that this is the operation of the open process A described above.

The ebullition process also becomes an open process; it is in fact equal to the process B described previously: the flow $m'$ enters the endstage at high level after first going through the additional turbine 2''', the liquid flow entering the open stage 1 at low level is $M + m$, the exiting vapor flow is $M + m'$. This flow then goes through compressor 7.

The flow $m'$ involved in the condensation process supplies the ebullition process on the whole with the additional heat required to balance the exchanges of measurable heat, two by two; this heat is distributed among the stages so as to balance the exchanges of measurable heat between two corresponding stages; this is due to the properties of polytropic machines that permit reversible heat circulation from one temperature to another.

According to the present arrangements, the condensed and evaporated flows in corresponding stages are identical.

The total work (work of the condensation process minus the work of the ebullition process) is received from the outside, as mentioned above. Since there is no heat exchange with the outside, this work is the reversible work of unmixing.

We will now describe the operation of real processes in the general case, where the solution to be treated has a finite concentration.

In a real process of concentration of a solution, the various irreversibilities (fractioning into finite stages, efficiency of the compressors and the trubines, exchange temperature differentials) prodice additional sources of heat both in the condensation process and in the ebullition process.

Furthermore, since the solution to be treated has a finite concentration, we have:

$$p_1 > p'_1$$

Compressor 7, which is adiabatic, displays an overheating which produces a supplementary source of heat.

Figure 3:
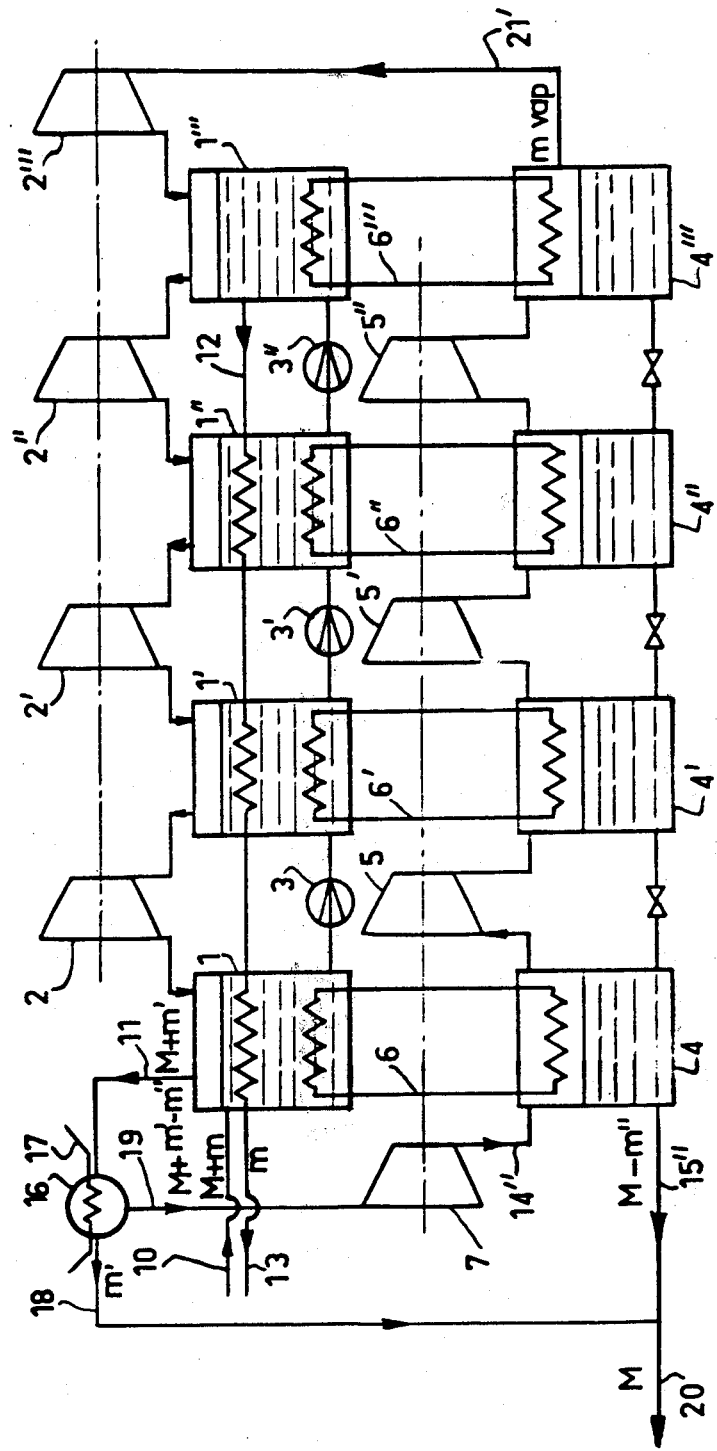
FIG. 3 is another diagram illustrating practical conditions of operation for the process of the invention.

In accordance with a preferred characteristic of the invention, this heat is evacuated in accordance with the embodiment illustrated in FIG. 3.

The flow $M+m'$ exiting along arrow 11 is partially condensed in condenser 16 by means of the external cooling circuit 17. There exits, along arrow 18, a condensate flow $m''$, and along arrow 19, the vapor flow $M+m'-m''$ which enters the open stage 4 of the condensation process. The vapor flow out of cell $4'''$ remains $=m'$; the liquid flow out of cell 4 along arrow $15''$ is now $M=m''$. The liquid flow along arrows 18 and $15''$ reunites to form flow M which exits along arrow 20.

On the whole, the concentration process receives the flow $M+m$ of diluted solutions; output is in part the flow m of concentrated solution and in part the flow M of solvent.

The value of the work furnished by the outside is: the work by the compressors in the condensation process plus the work of compressor 7 minus the work into the turbines of the ebullition process.

The heat thrown out is that evacuated at the level of condensor 16; its origin is exclusively the irreversibilities of the real thermodynamic operations involved.

In fact, since the irreversibilities contribute supplementary heat to the overall process, there is no longer any need to provide the additional flow $m'$ to compensate for the imbalance in the heat exchanges caused by the different specific heats of the solutions and of the solvent; similarly, turbine $2'''$ is no longer needed, in principle. It will be kept, however, as a variant embodiment, since it can usefully contribute operational flexibility to the system.

Figure 4:
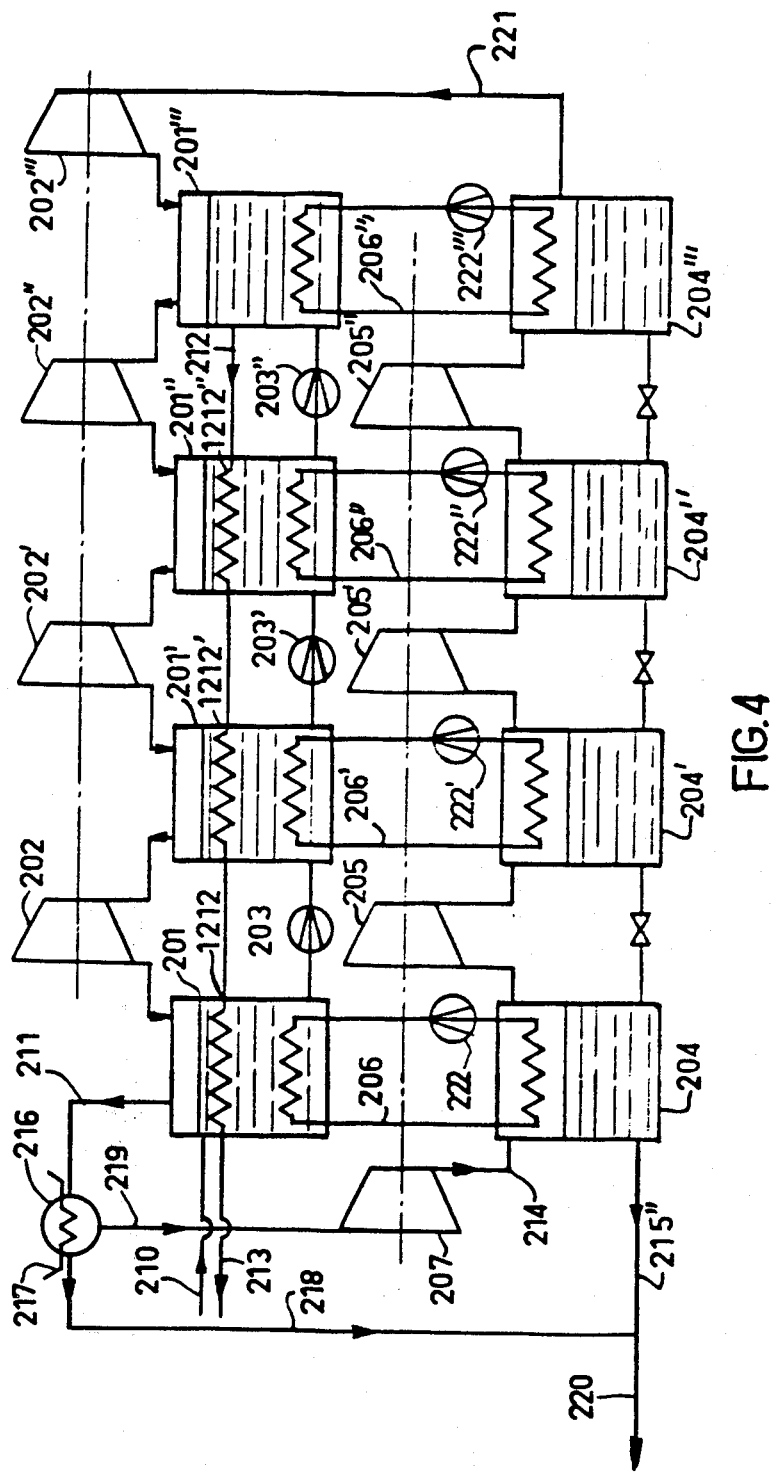
FIG. 4 is a diagram of a device for the operation of the invention.

An embodiment for the operation of the process of the invention is illustrated in FIG. 4.

The ebullition process is carried out by a heated turbine series comprising the turbines 202, $202'$, $202''$ and $202'''$, the exchange cells 201, $201'$, $201''$ and $201'''$, the heat-transmission circuit 212, comprising the exchange elements 1212, $1212'$ and $1212'''$ and the pumps 203, $203'$ and $203''$.

The condensation process is insured by a cooled compressor series comprising compressors 205, $205'$ and $205''$ and the exchange cells 204, $204'$, $204''$ and $204'''$.

The solvent vapor exiting from cell 201 through pipe 211 flows into condenser 216 cooled by the external circuit 217; the flow of non-condensed vapor flowing out of the condenser enters the compressor 207 through pipe 219 and is introduced into cell 204 by pipe 214. The vapor out of cell $204'''$ is introduced into turbine $202'''$ by means of pipe 221. The condensed portion of the flow that has gone through condenser 216 joins through pipe 218 the liquid flow out of cell 204 through pipe $215''$, the total of the two flows then being evacuated through pipe 220.

The heat exchanges between the cells of the corresponding stages can be carried out by heat-transmitting circuits 206, $206'$, $206''$ and $206'''$ exchanging heat through partitions, the heat-transmitting fluid being carried by pumps 222, $222'$, $222''$ and $222'''$.

Figure 5:
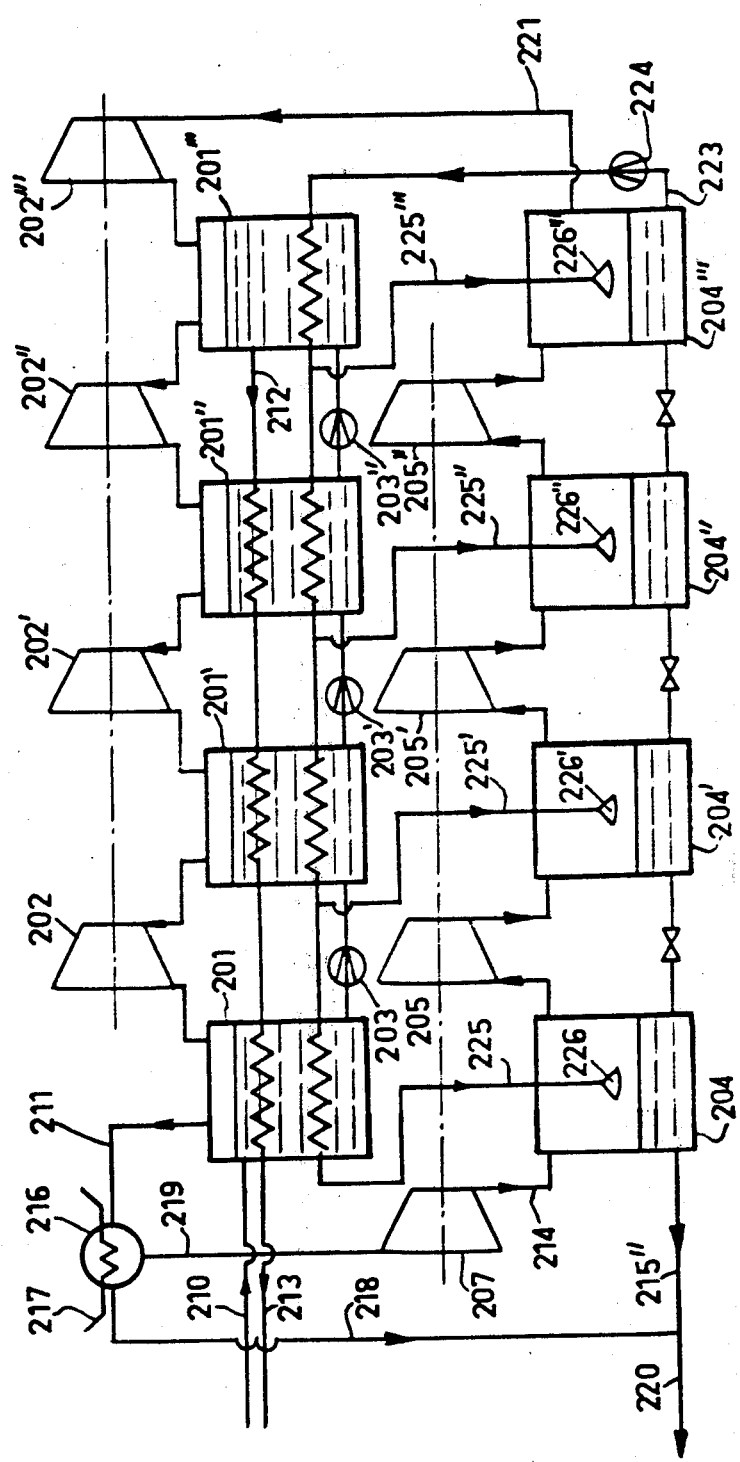
FIG. 5 is the diagram of another device embodying the operation of the invention.

However, in accordance with the preferential modalities of FIG. 5, the exchanges can be effected in the compressor series by direct contact, using the solvent itself as heat-transmitting fluid between corresponding stages. The sequence is: solvent liquid out of cell $204'''$ is pumped through pipe 223 by pump 224; this flow is then cooled in cell $201'''$; a fraction is removed through pipe $225'''$, flows through a dispersion device $226'''$ and cools cell $204'''$ by direct contact, etc. up to the last stage where the rest of the solvent flow—by means of pipe 225—circulates through a dispersion device and cools cell 204 by direct contact.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the concentration of a dissolved material from a solution of said dissolved material and a solvent, said method comprising:

providing a first set of stages with exchange cells each having liquid and vapor sides, said exchange cells serially connected at said vapor side by turbines and at said liquid side by conduits including pumps providing a second set of stages with exchange cells each having liquid and vapor sides, said exchange cells being serially connected at said vapor sides by compressors and at said liquid sides by conduits including calibrated orifices;

introducing as a working fluid a flow of dilute solution into a first endstage of said first set of stages;

utilizing only work generated heat from a corresponding stage of said second set of stages to ebullate a portion of said dilute solution by indirect heat exchange;

utilizing said pumps to transfer at least a portion of the remaining solution to succeeding stages of said first set of stages and towards a second endstage;

utilizing only work generated heat from the corresponding stages of said second set of stages to ebullate a portion of said dilute solution in said succeeding ones of said first set of stages by indirect heat exchange;

introducing a flow of concentrated solution into said second endstage of said first set of stages;

returning the resulting solvent vapor to said first endstage through said turbines to thereby furnish work;

returning from said succeeding stages to said first endstage of said first set of stages, a resulting concentrated solution having an amount of said dissolved material equal to the amount initially introduced in said first endstage, and exiting said concentrated solution from said first endstage of said first set of stages;

introducing said returned resulting vapor from said first endstage of said first set of stages through a compressor and into a corresponding first endstage of said second set of stages;

removing said work generated heat from said vapor in said first endstage of said second set of stages by indirect heat exchange to said corresponding first endstage of said first set of endstages so as to condense at least a portion of said vapor;

transferring at least a portion of the remaining vapor through said compressors to succeeding stages of said second set of stages and towards a second endstage thereby absorbing work, while removing work generated heat by indirect heat exchange at each said stage to the corresponding stages of said first set of stages so as to condense said vapor; and returning from said succeeding stages of said second set of stages to said first endstage of said second set of stages, said condensed solvent vapor, and exiting said condensed solvent vapor from said first endstage of said second set of stages.

2. The method of claim 1 wherein said concentrated solution introduced into said second endstage of said first set of stages is introduced from said second endstage of said second set of stages via a turbine.

3. The method of claim 1 or 2 wherein a portion of said solvent vapor exiting said first endstage of said first set of stages is condensed in a condenser while another portion enters said first endstage of said second set of stages through said compressor.

4. The method in accordance with claims 1 or 2 wherein said liquid solvent is used as the heat-transmitting fluid, a flow of said liquid solvent being drawn from said second endstage of said second set of stages and made to traverse the stages of said first set of stages thereby furnishing heat to said first set of stages, a quantity of said solvent also being drawn from each stage of said second set of stages and introduced in a dispersed condition into the corresponding stage of said first set of stages in order to cool said first set of stages.

* * * * *